April 24, 1934.   G. W. BOOTH   1,956,208
CAPPING MACHINE
Filed July 27, 1931   4 Sheets-Sheet 1

Inventor
George W. Booth

April 24, 1934.   G. W. BOOTH   1,956,208
CAPPING MACHINE
Filed July 27, 1931   4 Sheets-Sheet 2
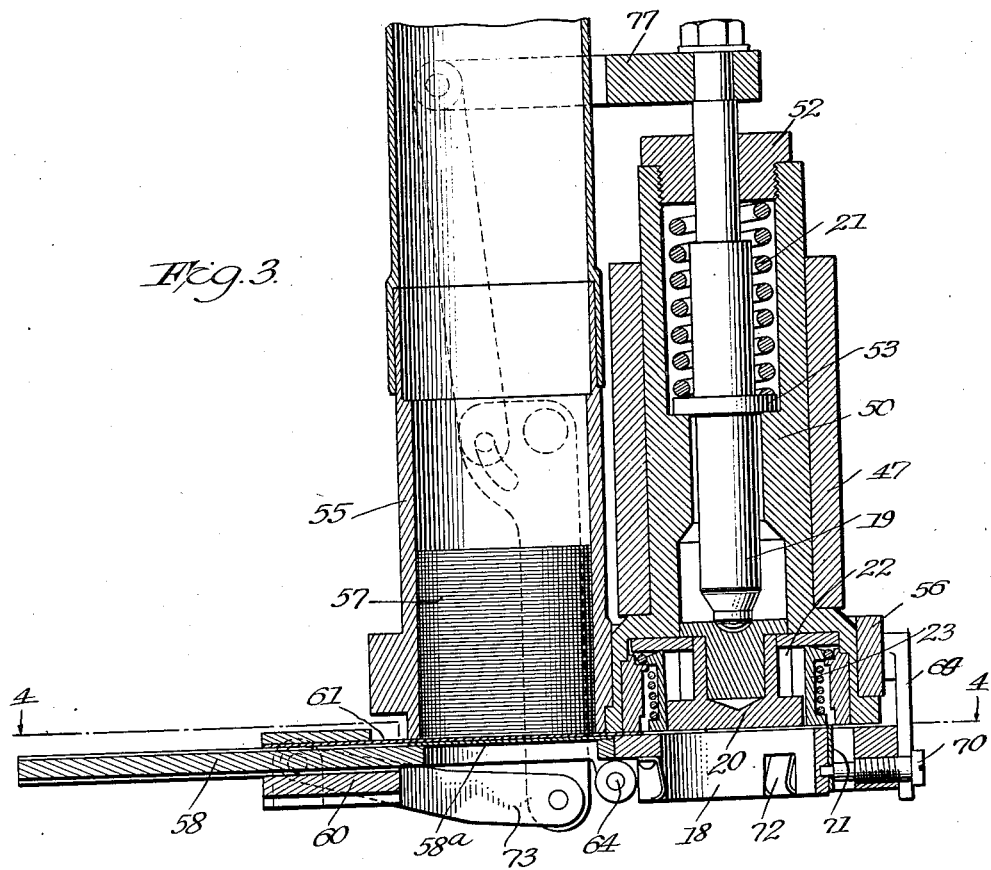
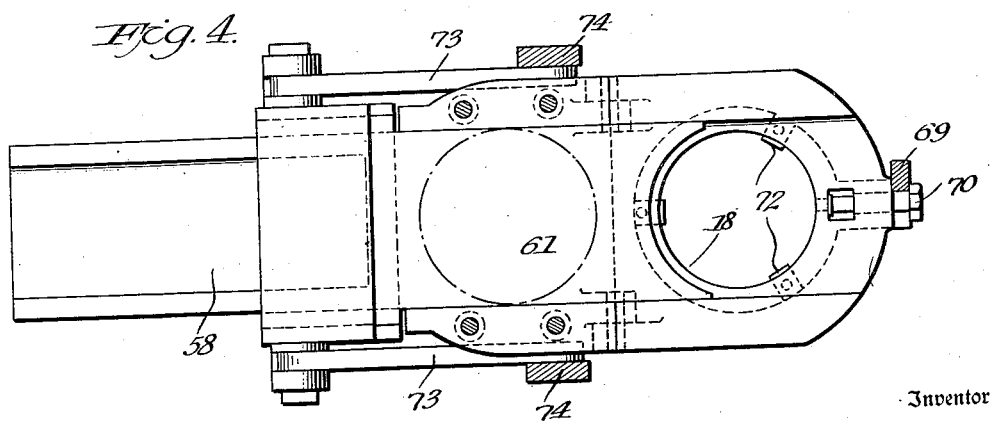
Inventor
George W. Booth
By [signature]
Attorneys April 24, 1934.　　　G. W. BOOTH　　　1,956,208
CAPPING MACHINE
Filed July 27, 1931　　　4 Sheets-Sheet 3
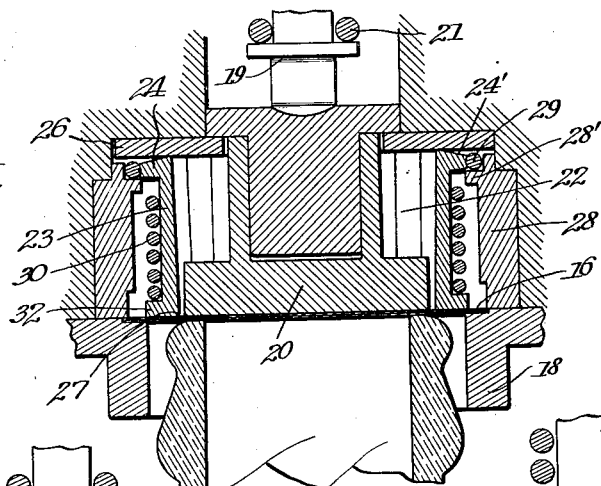
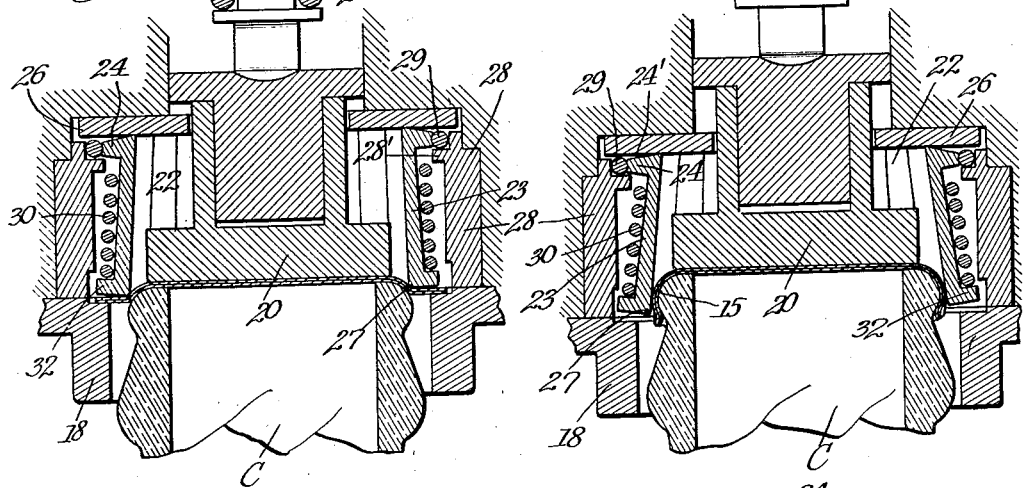
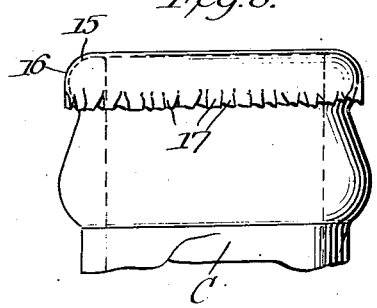
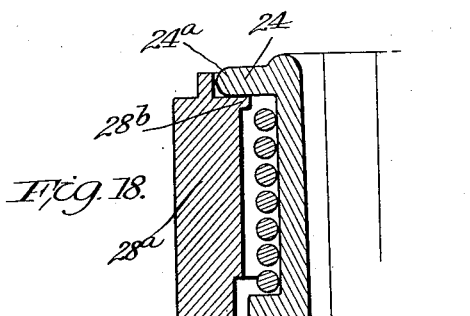
Inventor
George W. Booth
Attorneys April 24, 1934.　　　G. W. BOOTH　　　1,956,208
CAPPING MACHINE
Filed July 27, 1931　　4 Sheets-Sheet 4
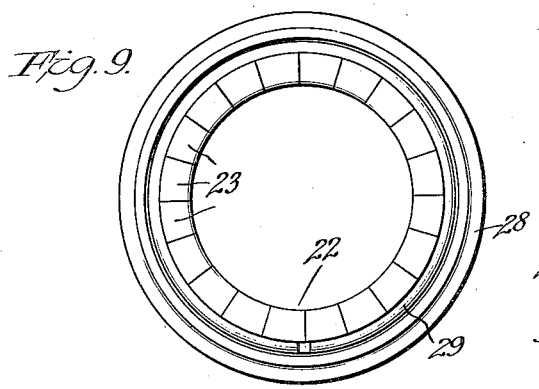
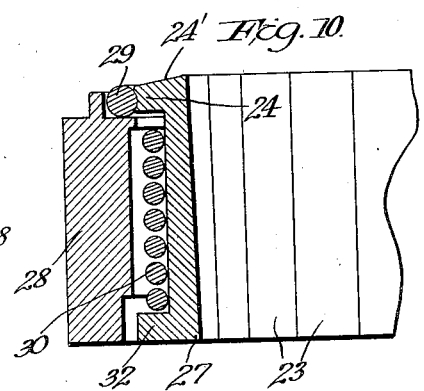
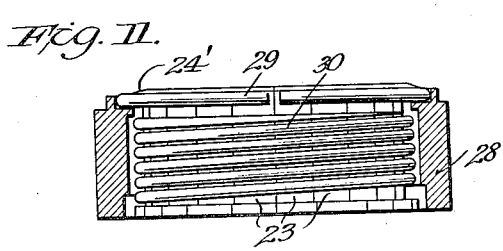
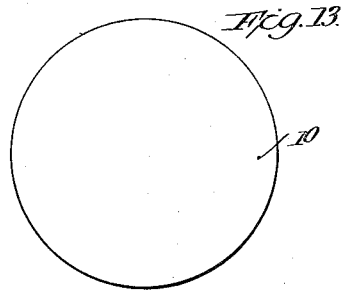
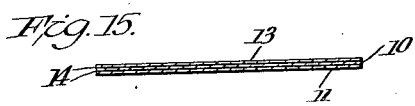
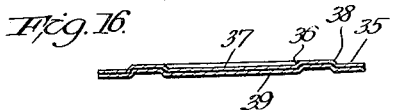
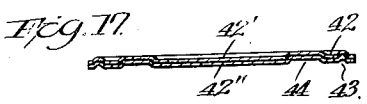
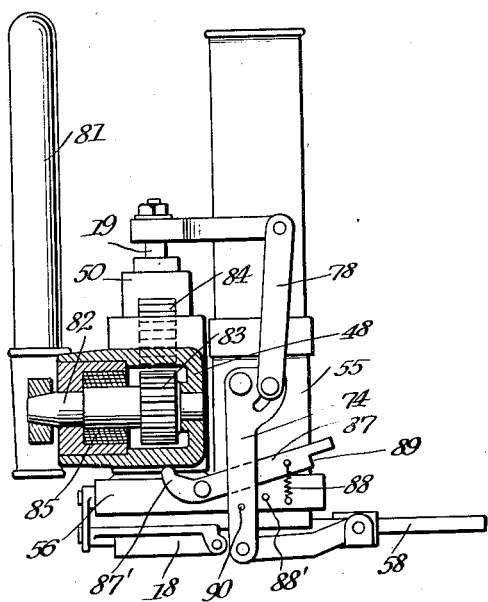
Inventor
George W. Booth,
By Cushman Byant Derby & Cushman
Attorneys Patented Apr. 24, 1934

1,956,208

UNITED STATES PATENT OFFICE 1,956,208

CAPPING MACHINE

George W. Booth, Baltimore, Md., assignor to Crown Cork & Seal Company, Inc., Baltimore, Md., a corporation of New York Application July 27, 1931, Serial No. 553,462

21 Claims. (Cl. 226—83)

The present invention relates to machines for capping containers and more particularly to machines for capping containers of the type having a bead or shoulder forming a finish around the container mouth.

The machine of the present invention is intended primarly for practicing the method disclosed in the application filed by me, Serial No. 553,464, filed July 27, 1931.

An object of the invention is to provide a machine which will automatically feed and apply to a container a substantially flat closure or a closure having a substantially flat marginal portion which lies, preferably, in substantially the plane of the body of the closure, as distinguished from closures of the conventional crown type which have a flaring, crimped skirt.

Heretofore, in the capping art, closures intended for use with containers having surrounding their mouth a bead or shoulder, have included a skirted metallic shell provided with crimps or flutes. This skirt is deformed by the throat of a capping machine so as to cause the inward flutes or corrugations of the skirt to pass beneath and engage the bead or finish about the bottle mouth.

In other forms of this type of closure, the metal shell has been provided with a substantially vertical or cylindrical skirt, the lower edge of which has been forced below the locking bead or finish of a container by spinning operation.

With closures of the old type referred to, it is necessary to provide the capping machine by which the closures are applied to bottles, with a feeding mechanism adapted to receive such closures in bulk and to adjust them in relation to a feed chute so as to cause the closures to be successively pressed in proper position and relation to the closure applying mechanism.

The present invention contemplates a machine which will automatically feed to a capping head a substantially flat disc, as distinguished from the cupped, preformed closure heretofore utilized, and which will, upon presentation of the disc to the head, iron or draw the ductile material of the closure over the sealing lip of the container in such a way as to cause the flat marginal portion of the disc to buckle beneath the shoulder or bead and securely lock the closure upon the container.

As distinguished from the conventional type of capping machine in which there is provided a throat to force the inward corrugations beneath the locking bead or finish by a mere engagement between the throat and the flaring skirt, the machine of the present invention provides means for forming the skirt in situ, i. e., upon the container and to effect a sealing engagement between the skirt and container over an extended area.

The invention has as an object the provision of a mechanism which will form the skirt in accordance with the surface dimensions of each container, thereby producing an extended sealing area as distinguished from the narrow, substantially line sealing contact obtainable with the conventional crown type of cap. Another object of the invention is to provide a machine which is adapted for applying closures to containers the dimensions of which vary considerably, thereby affording a machine which will enable a cap of given dimension, when applied in accordance with the method disclosed in my copending application, to be applied to containers of various dimensions.

A still further object of the invention is to provide a capping machine having a novel and improved form of bending throat and one which will serve to iron and draw the metal of a substantially flat disc closure closely over the surface of a container surrounding its mouth until the free marginal portion of the closure will automatically buckle beneath the shoulder or finish surrounding the mouth.

A still further object is to enable a closure of given dimensions to be utilized with containers which vary considerably in shape and dimensions, and which will afford a more extended area of sealing engagement than has heretofore been possible.

The machine of the present invention is so constructed that it will apply a closure to a container by bending and forming a disc having initially no skirt, the part which embraces the surface surrounding the container mouth being formed as a result of the action of the mechanism of the cap machine.

This mode of operation has the advantage that the closure applied to each bottle will be accurately formed in relation to the pouring lip of the bottle and caused to conform accurately to variations in the dimensions of different bottles.

It also enables the closures to be produced from relatively cheap blanks which may consist of fairly hard, ductile material, such as sheet metal stock, faced upon one or both sides, if desired, with a suitable, compressible, backing material, against which the wall of the bottle mouth is sealed, or of suitable paper stock which may or may not be treated with oil, varnish, wax or any other suitable medium to make it substantially impervious to the liquid contents of the bottle, or other material or composition of sheet form.

In the machine of the invention, a cap applying mechanism is employed having two members or portions movable in relation to each other, one of which applies a sealing pressure to the closure blank upon the top of the neck of the bottle, and the other portion or member is a throat which engages the area of the blank or closure disc between the edge thereof and the portion against which the sealing pressure is applied, whereby as the portions are moved relatively to each other, the bending or ironing operation of the blank will be completed and the closure caused to conform closely to the outer edge of the bottle neck. Portions of the edge of the closure become crimped below a bead on the bottle by the application of the bending or ironing pressure applied inwardly from the periphery of the disc.

Further, the machine includes mechanism, cooperating with the means for applying sealing pressure and deforming the blank as described, for feeding blanks successively into proper relation to the applying devices at each actuation thereof.

In the machine of the invention, the throat-like member of the forming and applying devices comprises a plurality of spring actuated segments adapted to permit expansion of the lower portion thereof by rocking movement while the upper portion is held against expansion.

The invention consists in the novel features of construction and combination of parts that will be hereinafter set forth and described and more particularly pointed out in the appended claims.

Referring to the drawings:

Figure 3 is a vertical sectional view, on an enlarged scale, through the cap forming and applying devices and the cooperating blank container.

Figure 4 is a plan substantially on the line 4—4 of Figure 3.

Figure 5 is a sectional view showing relation of the parts at the start of the capping operation.

Figure 6 is a view similar to Figure 5 showing the next step in the capping operation.

Figure 7 is a view similar to Figure 5 showing the final position of the parts upon the completion of the capping operation.

Figure 8 is an elevational view showing the cap applied.

Figure 9 is a plan of the throat portion of the cap applying device.

Figure 10 is a fragmentary sectional view of the throat and housing therefor.

Figure 11 is a side elevational view of the throat with the housing shown in cross section.

Figure 12 is a fragmentary elevational view partly in section taken from the opposite side of the machine from that shown in Figure 2.

Figure 13 is a plan view of a suitable closure.

Figure 14 is an edge view of the closure shown in Figure 13.

Figure 15 is an edge view of a modified form of closure.

Figure 16 is an edge view of another modified form.

Figure 17 is an edge view of still another modification, and

Figure 18 is a sectional edge view of a modified form of throat.

Figure 1:
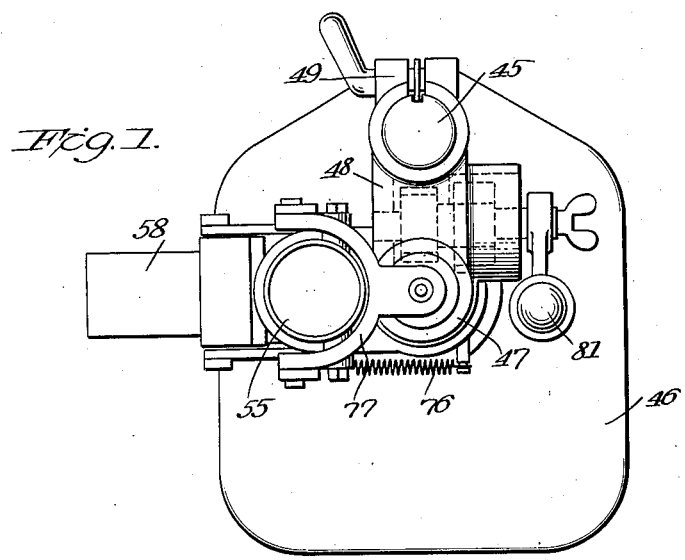
Figure 1 is a plan view of a bottle capping machine embodying the invention.

Although the machine may be used in applying caps of various types, it is intended primarily for the application of closures of the character disclosed in the copending application, above identified, filed by me jointly with Stanley W. Dennis and George Goebel, and the mode of operation of the machine will be best understood by referring briefly to this closure.

The preferred form of closure for which the machine is intended has a marginal portion which is uncrimped and which preferably lies in substantially the plane of the body of the closure or in a plane substantially parallel therewith, as distinguished from a preformed closure having a depending skirt which is crimped or fluted. In other words, the closure is a substantially flat disc. By "disc" is meant a body of any outline (whether circular, triangular or square), since the contour of the closure may vary considerably and is not material to the invention.

Closures of suitable forms are disclosed in the copending application, above referred to, and a number of forms are shown in Figures 13 to 17, inclusive.

Referring to Figures 13 and 14, it will be seen that the closure constitutes a complete article of manufacture which is substantially flat and may be termed a disc. It is of the type intended for a container having around its mouth a bead or shoulder formation, and consequently it is essential that the area of the disc be greater than the overall area of the mouth of the container to which it is to be applied. The body 10 of the disc is of thin ductile material, such as sheet metal, and it is simply essential that the material be of such character that, when the skirt is formed, the free edge or marginal portion will, under the pressure applied around the mouth of a container as hereinafter described, buckle beneath the bead or shoulder and securely lock the cap upon the container.

It is preferred that at least one surface of the body be provided with a facing 11 which is resistant to liquid or other contents of the container and if a plastic or fluid facing is not desired, suitable parchment or other cellulosic material may be used, the same being treated, if necessary, to make the same substantially impervious to the liquid contents of the container. Metal foil may be employed and for some purposes sheets of resilient material such as rubber compounds or composition cork may be applied to the ductile body.

If a facing of sheet form is employed, it is preferred to securely bond the same to the surface of the body by a suitable adhesive stratum 12 and any desired adhesive commonly used in the closure art may be employed, such as gutta percha or other liquid resistant adhesive.

As illustrated in Figure 14, the closure comprises two plies 10, 11, and an interposed adhesive stratum 12 is used when the facing ply is applied in sheet form.

The ductile body imparts the rigidity necessary for handling and to provide protection to the container contents, although its marginal portion may be readily deformed from its normal substantially flat form by capping mechanism adapted to apply closures of paper or other thin material.

If desired, both surfaces of the ductile body may be coated as illustrated in Figure 15, wherein the exposed or upper surface of the body 10 is provided with a facing 13 adhesively united to the ductile body by an adhesive layer 14. The facing on one or both surfaces of the body afford a sanitary contact surface, and compressible paper or similar material may be employed to afford a somewhat compressible medium which improves the sealing contact.

In some instances it may be desired to decorate the exterior surface and either the exposed metal surface of Figures 13 and 14 may be decorated with advertising or other matter, or the coated surface 13 of Figure 15 may be similarly treated.

Figure 2:
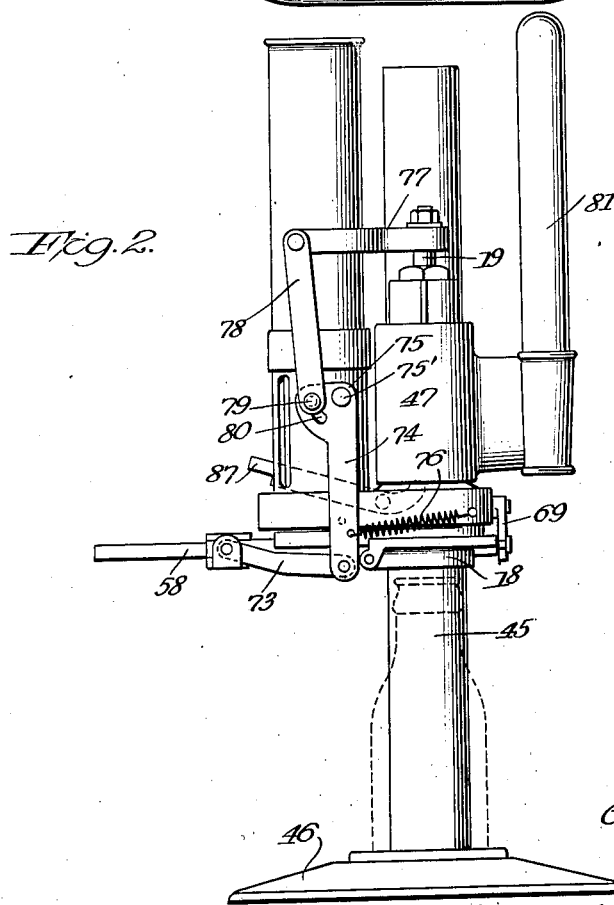
Figure 2 is an elevation.

In Figure 8 the cap is shown as applied to a container having the usual shoulder or bead 15 surrounding its mouth and as will be observed, the marginal portion 16 closely fits over and surrounds the surface of this bead from its top portion outwardly and downwardly beneath the bead wall. The crimps or corrugations 17 in the margin of the deformed disc securely lock the closure upon the container, and these crimps are to be distinguished from the conventional corrugations of flutes which are preformed in the skirt or a cap of the usual crown type since they differ both in construction and mode of formation, as will be clear from a description of the method of applying the closure to a container which is illustrated in Figures 1, 2 and 3.

Referring to Figure 16, there is shown a modified form of closure which inwardly from its marginal portion 35 is formed with a shoulder 36. The shoulder 36 is formed by deflecting the circular portion 37 of the body and there is formed between the shoulder 36 and an outwardly spaced shoulder 38 a channel adapted to receive the top surface of the lip. This channel or groove is comparatively shallow, and not only facilitates the centering of the cap upon the container, but facilitates the manufacture of the cap from a blank.

As will be understood, the ductile body is stamped from a sheet of faced ductile material, of suitable size to provide a number of closures, and it is desired after the stamping of the cap that the same be passed upwardly through the opening in the blank produced as a result of the formation of the cap. By forming the shoulder or channel, the area of the produced closure is less than the area of the opening and thus subsequent to the stamping operation of the cap, the latter may be passed upwardly through the opening and discharged, which is not possible in the production of caps of the form shown in Figures 13 and 14, inclusive.

It will be understood that although the cap of Figure 16 is shown with only a single facing 39, the same may be provided with a facing on both surfaces, if desired. It has in common with the form of Figures 13 and 14 the flat marginal portion disposed substantially in the plane of the body of the disc and in production of both forms, the margin is retained in a plane parallelling the plane of the blank as distinguished from deflecting the margin to produce a skirted closure.

In Figure 17, there is illustrated still another form which also has the substantially flat, i. e., uncrimped, margin 42 formed from a ply 42' of ductile material and a facing ply 42''.

By the term "flat", as used throughout the specification and claims in referring to the margin of the closure, is meant a margin which is not distorted along radial lines or uncrimped, as distinguished from the fluted or crimped margin of the conventional crown type of closure.

The margin in the present instance has a circular channel 43 which limits to some extent the length of the flutes or corrugations which are formed when the edge is buckled. The marginal portion is retained, as will be observed, in the plane of the body of the disc. Inwardly from the marginal portion the cap is formed with a channel 44 which assists in centering the cap upon the container.

Any of the closures above mentioned are representative of the type of closure for which the present machine is intended, and I will now refer to the drawings to describe in detail a preferred embodiment of the invention.

In the embodiment of the invention illustrated, the principal parts are a means for applying pressure to the closure to effect a sealing contact against the lip of a container when the skirt is formed and a locking engagement effected.

Referring to Figures 5 to 8, inclusive, the operation of these several parts independently of the remainder of the mechanism is illustrated.

In Figure 5, the closure is shown as positioned above a container C with its marginal portion 16 supported as by means of a surrounding guide or annulus 18. Inwardly from the marginal portion, the cap is placed under pressure, as by means of a spindle 19 having a presser tool 20 forced downwardly against the cap and container by means of a spring 21 surrounding the spindle. This pressure insures a proper centering of the disc upon the container and a close contact between the under surface of the disc and the top surface of the bottle lip.

While held under pressure the portion of the disc between its marginal portion 16 and the presser tool 20 is uniformly drawn downwardly or ironed over the curved surface of the locking bead as illustrated in Figure 6. During this operation, it is preferred to continue supporting the marginal portion or edge 16 of the closure, thereby insuring a gradual or progressive deflection of the closure along the surface of the same from the point of initial application of pressure outwardly to its edge.

This ironing and drawing of the metal to form a closure skirt in situ may be accomplished by means of a bending throat 22 surrounding the presser tool 20. The throat is formed of a plurality of segmental strips 23 each having at its upper end an outwardly directed flange 24, the top beveled surface 24' of which bears against a flat follower plate 26.

The several segments are supported at their upper ends within the housing 28 upon a shoulder 28' in such a way that the segments are held against separation at their upper ends, thereby insuring a proper centering of the cap on the container as its margin is drawn downwardly over the bead. The supporting means should permit rocking movement of each segment to permit opening of the throat at its lower end as shown in Figure 6. In the present form, there is provided a split ring 29 against which the outer edge of each flange 24 has a fulcrum bearing. Each flange 24 has a grooved outer end as particularly shown in Figure 10 and these grooves are circumferentially continuous. Split ring 29 is engaged in this circumferential groove, so that it not only holds the upper ends of the segments together, but acts to prevent their relative longitudinal displacement. This ring rests upon the shoulder 28, and having a close fit in the housing, prevents opening of the throat in the plane of the ring. An encircling coil spring 30 yieldingly holds all of the segments in contacting engagement with each other below their upper ends and permits relative movement between such segments and separation thereof below ring 29 during the operation of applying the closure to a container. At its lower end, each segment has a sharp bending edge 27 and a flange 32 spaced slightly from the housing or casing 28 a sufficient distance to permit a limited expansion of the throat adjacent the bottom thereof. As will be observed, the segments have a slight longitudinal taper with longitudinally rectilinear inner surfaces, as here shown so that the diameter of the lower end of the throat is less than that of the upper end. This minimizes the contact between the inner surfaces of the segments and the cap with the result that substantially the entire ironing action is produced by the edges 27.

As will be observed (Fig. 7) the segments are free to move outwardly at their lower ends a considerable distance, due to the fact that there is a substantial clearance between the flange 32 and the interior of the housing. On the other hand, the segments are held against outward movement at their upper ends; and this insures the maintenance of all segments in a fixed and properly centered position within the housing, as distinguished from the floating type of throat which has been used with the conventional crown cap and which would not be efficient in applying a flat disc type closure for which the present machine is intended.

Moreover, when the closure has been fully formed, the segments assume the position shown in Figure 7, with the lower end of the throat expanded and the upper end of normal diameter. The surrounding coil spring is thus expanded to a greater extent in planes adjacent the bottom of the throat than in high planes, with the result that increased bending pressure is applied by the spring near the bottom of the throat and at the bending edges 27. The top face of each segment is reduced to a narrow edge contacting with the follower plate 26, and this narrow line of contact freely permits the rocking movement of the segments on the supporting ring.

In Figure 18, there is shown a modified construction in which the housing 28a has a shoulder 28b and the individual segments are formed so that the supporting ring of the form previously described, is, in effect, integral with the throat. In this form, each flange 24 is extended to provide a curved outer end 24a, which bears and has a rocking movement against the inner surface of the housing above the supporting shoulder. It will be understood that this curved outer end corresponds to and performs the function of the ring, in that it provides a rocking bearing for the segments and there is provided, in effect, an integral supporting ring constituted by the ends of the flanges.

Relative movement between the container and the bending throat, while pressure is maintained against the closure by means of the pressure tool and while the marginal portion of the disc is supported by the guide annulus 18, may be effected either by moving the container upwardly or moving the throat downwardly and relative movement is permitted by the yielding of spring 29 which permits the presser tool 20 to move upwardly within the bending throat.

In Figure 7 the final position of the closure is illustrated and as will be understood, the relative movement between the throat and closure results in the progressive ironing and drawing of the metal of the closure outwardly and downwardly toward the edge of the closure until the free marginal portion is disengaged from the support 18. Under the drawing and ironing action, this free edge or marginal portion buckles inwardly, as illustrated in Figure 3, beneath the bead or shoulder of the container.

This buckling action produces the crimps or corrugations shown most clearly in Figure 8 and the same will at all times be maintained free of engagement with the ironing and bending throat which does not move inwardly beneath the shoulder, but has its edge 27 and inner surface in contact only with the portion of the bead above and down to the horizontal plane of its greatest radius.

It will be apparent, therefore, that the flat marginal portion of the cap will buckle and crimp beneath the bead or finish of a container simply by applying bending and drawing pressure around the container mouth inwardly from the margin of the closure and that the formation of the skirt in situ or upon the container automatically produces the buckling of the free edge or marginal portion of the closure and the locking of the formed closure in position.

A closure of any given dimension may be applied to containers which vary considerably in dimensions, due to the clearance between the flanges 32 and the housing, and since the skirt is formed by ironing pressure applied over the container surface, it will conform to irregularities in the bottle finish and provide a maximum area of sealing engagement.

The means for operating the several parts above described may take various forms and I will now describe the details of the preferred embodiment illustrated in Figures 1 to 4, inclusive.

The capping head is mounted for vertical reciprocation on a column 45, which is supported by a suitable base 46.

The parts are adapted to reciprocate in a sleeve 47 which is carried by an arm or boss 48 surrounding upright or column 45; the arm may be secured to the column at any desired elevation by means of a suitable clamp 49. Slidably mounted in the sleeve 47 is a tubular member 50 which is recessed at its upper end to provide a chamber for the spring 21. The chamber is closed at its outer end by a removable plug 52.

The stem or spindle 19 extends axially through the member 50, and the spring 21 surrounds this stem and at its ends bears against an abutment 53 on the stem and against the plug 52. The member 50 is enlarged below the sleeve 47 and within a recess or housing 28 formed in such enlarged portion is arranged the cap presser tool 20, which abuts, by ball and socket joint 54, the lower end of the stem 19. Within the recess at the lower end of the member 50 surrounding the presser tool 20 is the ironing and forming throat 22, formed of the several segmental strips 23 each having at its upper end the outwardly directed flange 24, the top bevelled surface 24' of which bears against the flat follower plate 26.

A supply hopper or container 55 for closures is arranged at one side of the bearing sleeve 47 and is supported from the tubular member 50 by a collar 56. The container 55 is adapted to receive a stack of closure blanks 57, and means are provided whereby said blanks are successively transferred from the bottom of said container to a position beneath the presser tool 20.

A base plate 58 at the lower end of the blank container 55 is provided with a guide for a slide 60 which includes a plate 61 adapted to reciprocate beneath the blank container 55 and having at one end a recess which conforms to the curvature of the vertical wall of the container, so that when the slide is at the limit of its movement in one direction (toward the left, Figures 6 and 7), the lowest blank in the container will be positioned on a plate 58ª and within said recessed portion of the slide. The plate 58ª is fitted in guides on the base plate and extends across an aperture formed in said base plate and through which the blanks in the receiver may be withdrawn when the plate is moved from the left from beneath said opening.

As the slide 60 is reciprocated, the blank positioned in the recessed end of the plate 61 will be moved to the right into position beneath the plunger or presser tool 20.

A bottle neck guide 18 is positioned beneath the presser tool 20, being hinged at 64 to the base 58 and is adapted to be held in the position shown in Figures 6 and 7 by a hook 69 engaging the projecting part of a screw extending from said bottle guide and cap support. As is shown, the screw 70 supports an abutment plate 71, which limits movement of the blank to the right and with which contacts the edge of the blank positioned beneath the presser tool 20 on the support 18.

The guide and support 18 includes a plurality of guide fingers 72 in the form of short leaf springs, which act to center a bottle neck introduced therein so that the bottle will be properly presented to the cap presser tool 20.

Reciprocation of the blank feeding plate is effected by links 73 connecting the slide 60 with the levers 74. The levers 74 are pivotally mounted at 75 on the container and are automatically rocked about the pivots 75' at one direction by a connection with the vertically reciprocable stem 19 and in the other direction by the action of a suitable spring 76. This connection with the stem 19 comprises a yoke 77, the arms of which are pivotally connected to links 78, each having adjacent its lower end a stud or pin 79 which extends into a slot 80 in the adjacent lever 74.

Vertical movement is imparted to the blank forming means toward the container, in the present form of apparatus, from a suitable handle or operating lever 81 connected to a shaft 82 having bearings in the frame arm. Between the shaft and the tubular member 50 are interposed a suitable gear 83 and a rack 84 (Figure 12) so that as the handle 81 is turned in one direction, the member 50 and parts connected thereto will be bodily moved downward and the neck of a container positioned on the base 46 will fit into the guide 18, and the mouth thereof brought into contact with a blank which has been properly positioned beneath the presser tool 20. Continued downward movement of the member 50 will cause the tool 20 to move upward relative to the tubular member 50, thereby compressing the spring 21 and the engagement of the expansible throat with the blank will iron or draw the ductile material of the latter so that the margin of the closure extends downward of the rim surrounding the bottle mouth.

The relative movement between the stem 19 and tubular member 50 will operate to swing the levers 74 to the left (Figure 2), withdrawing the body of slide plate 61 from beneath the container and permitting the lowermost blank to fall into position of the recessed end of the slide plate.

A lever 87 fulcrumed on the ring or base member 56 has one end 87' bearing against the lower surface of the stationary frame or boss member 48 so that when the parts are in the uppermost position, it is held in the relation shown in Figure 12.

As the capping head moves downward upon actuation of the lever 81 a spring 88 acts to depress the longer arm of said lever 87, the short arm being disengaged from the boss 48, and brings a shoulder 89 on the lever into the path of a stud 90 on one of the levers 74 when the latter is at the limit of its movement toward the right (Fig. 12). Downward movement of lever 87 is limited by a stud 88' on the collar 56. The blank feed slide is thus locked in position beneath the container.

On the next upward movement of the cap applying devices, the lever 87 is again rocked into the position shown in Figure 12 to permit the spring 76 to operate as before described to move the blank feed slide to the right (Figs. 6 and 7), and position another blank beneath the presser tool 20. This feed is permitted by the lifting of lever 87 upon re-engagement of its short end 87' with the arm or boss 48, as shown in Figure 12, the lever being carried into engagement with the boss by the upward movement of collar 56 on which it is pivoted.

When the operating lever is returned to its normal position, either manually or by the action of a suitable spring 85 (Figure 12), the spring 21 will act to restore the presser tool stem 19 to the position shown in Figure 7. During such return movement, the spring 76 will move the levers 74, to carry a cap to a position above the bottle guide 18, such movement being limited by the abutment plate 71.

The construction of the forming throat has been previously described, and as will be observed the presser tool 20 is circular in horizontal cross section, having a sliding fit within the forming throat. In the form of the invention shown, the lower face of the tool is flat throughout the area thereof.

The operation of applying a closure to a bottle by this mechanism is briefly as follows:

A container to be capped is supported on the base 46 below the plate 58 and substantially in axial alignment with the bottle neck guide and cap support 18. A plurality of closures having been previously positioned in the receiver, and the parts being in the position shown in Figure 7, a preliminary rocking of the operating lever will transfer the lowermost blank from alignment with the receiver into position beneath the presser tool 20, where it is supported by the combined bottle guide and support 18. Continued operation of the lever 81 will cause a downward movement of the tubular member 50, of the stem 19 and the presser tool 20. This movement will carry downward the plate 58, the blank container and the parts movable therewith. The guide 18 will operate to accurately center the mouth of the container in proper relation to the presser tool 20 and the bending throat.

Such downward movement will carry the closure, which is in alignment with the bending throat, against the mouth of the container and during the continued movement, the spring and tool 20 will maintain the desired sealing pressure between the closure and neck of the container.

This relative movement between the sealing head and container will act to form the depending skirt on the closure hereinbefore described, and the skirt will conform to the lip of the bottle throughout the top and side portions of the lip and provide an extended sealing area. The corrugated or fluted portions shown in Figure 4, are due solely to the forming action of the throat in drawing of the metal outwardly and downwardly from the top of the lip. The ductile material buckles automatically due to the uniform, downward and outward continued pressure, and due to the recessed area beneath the bead. The formation of these crimps about the closure is due solely to the tendency of the ductile material of the closure to buckle when being bent to the cup form. The number, spacing, and formation of the crimps varies with different closures, part of the material of the closure being moved inwardly and part outwardly.

The crimps are developed only along the edge of the closure, the action of the bending throat being to draw and form the marginal portion of the closure contact with the container closely about and in engaging relation with the curved top and side of the bead or shoulder.

In the applying operation, the edge 27 of the bending throat performs substantially the entire drawing and ironing action, due to the fact that the opening within the throat enlarges in an upward direction, thereby preventing any extended engagement between the inner surfaces of the segments and the cap which would tend to weaken the locking engagement of the cap with the bottle finish.

It will be understood that the bending throat does not engage beneath the bead of the bottle and is maintained out of engagement at all times with the crimped edge of the closure which interlocks with the inner surface of the bead or shoulder upon the container entirely because of the tendency of the cap to buckle after the ironing and drawing pressure has been carried a sufficient distance toward the edge of the cap.

While I have described the invention as applied to a hand-machine and to a machine in which the cap and head move while the container is stationary, it will be understood that it is merely necessary that there be relative movement between the container and bending throat and that either or both may be moved either by hand or by power means.

It will be understood, of course, that numerous modifications may be made in the structure illustrated and described without departing from the invention, the dominant features of which are set forth in the following claims.

I claim:

1. A capping machine embodying therein a presser tool operative adjacent but within the edge of a substantially flat closure member, and a follower consisting of a head provided with a downwardly opening chamber in which said presser tool is positioned, a fulcrum ring adjacent the top of said chamber, a throat consisting of a plurality of segmental sections, each being provided a rocking bearing by said fulcrum ring, and yieldable means normally holding the segmental portions of said throat in engageable relation with each other, said throat surrounding said tool and being formed so as to engage at its bottom edge the portion of said closure between the presser tool and the edge of the closure.

2. A capping machine embodying therein a presser tool operative adjacent but within the edge of a substantially flat closure member, and a follower consisting of a head provided with a downwardly opening chamber in which said presser tool is positioned, a fulcrum ring adjacent the top of said chamber, a throat consisting of a plurality of segmental sections forming a progressively enlarging throat opening, and each being provided a bearing by said fulcrum ring, and yieldable means normally holding the segmental portions of said throat in engageable relation with each other, said throat surrounding said tool and being formed so as to engage at its bottom edge the portion of said closure between the presser tool and the edge of the closure.

3. A capping machine embodying therein a reciprocatory plunger having a head provided with a downwardly opening chamber, a stem concentric with said plunger and movable in relation thereto, a presser tool carried by said stem within said chamber having a head the downwardly presented face of which is engageable with the closure above the opening in the neck of a bottle, a spring acting upon said stem permitting movement of said tool upwardly of said chamber, a fulcrum ring adjacent the top of the chamber, a throat consisting of a plurality of segmental sections each bearing upon said fulcrum ring, and yieldable means normally holding the segmental portions of said throat in engageable relation with each other, said throat sections each having an inner surface formed to prevent inward movement beneath the shoulder of a container lip and to cause the lower edge of the section to bend the closure.

4. A capping machine embodying therein a reciprocatory plunger having a head provided with a downwardly opening chamber, a stem concentric with said plunger and movable in relation thereto, a presser tool carried by said stem within said chamber, a spring acting upon said stem permitting movement of said tool upwardly of said chamber, a throat within said chamber surrounding said presser tool, said presser tool being operative adjacent but within the edge of a substantially flat closure member, and said throat being engageable with the portion of said closure between the presser tool and the edge of the closure, a plate movable with said plunger and spaced from said head, said plate having an opening therein in axial alignment with said plunger and said stem, a chute adapted to receive a stack of closures carried by and movable with said plunger, a bed plate carried by said plate and extending across and spaced from the open bottom of said chute, a slide mounted upon said bed plate, a feed plate actuated by said slide, a lever pivotally connected with said chute, a link connected at one end with said stem, pins carried by said link at its other end and engaging said lever, and connections between said lever and said slide.

5. A capping machine embodying therein a reciprocatory plunger having a head provided with a downwardly opening chamber, a stem concentric with said plunger and movable in relation thereto, a presser tool carried by said stem within said chamber having a head the downwardly presented face of which is engageable with the closure above the opening in the neck of the container, a spring acting upon said stem permitting movement of said tool upwardly of said chamber, a fulcrum ring above the bottom of said chamber, a throat consisting of a plurality of segmental sections and having an opening therein, each section having a portion engaging said fulcrum ring and having a rocking movement thereon, a spring normally holding the segmental portions of said throat in engageable relation with each other, said throat surrounding said presser tool and being formed adjacent the bottom thereof so as to engage the portion of said closure between presser tool and the edge of the closure, a plate movable with said plunger and spaced from said head, said plate having an opening therein in axial alignment with said plunger and said stem, a chute adapted to receive a stack of closures carried by and movable with said plunger, a bed plate carried by said plate and extending across and spaced from the opening bottom of said chute, a slide mounted upon said bed plate, a feed plate actuated by said slide, a lever pivotally connected with said chute, a link connected at one end with said stem, pins carried by said link at its other end and engaging said lever, and connections between said lever and said slide.

6. In a capping machine, a sealing head comprising a presser tool adapted to engage a substantially flat closure member and retain the same against a container lip, and a bending throat asscciated with said tool having an inner edge at its bottom surrounding the tool, said throat having an upwardly enlarging opening adapted to cause bending engagement between the inner bottom edge of the throat and the container.

7. In a capping machine, a sealing head comprising a presser tool adapted to engage a substantially flat closure member and retain the same against a container lip, and a bending throat associated with said tool adapted to engage the closure inwardly from its edge and surrounding the tool, said throat comprising a plurality of segments, each having an upwardly and outwardly inclined inner surface surrounding the presser tool to form an upwardly enlarging throat opening, and means supporting said segments for rocking movement at substantially their upper ends and serving to resist bodily separation thereof while permitting rocking thereof.

8. In a machine of the class described, a bending throat comprising a plurality of segments forming a central, upwardly enlarging opening, a supporting housing, each segment having above its bottom a support in said housing constantly holding the segments against bodily separation but allowing rocking movement of the segments whereby to permit enlarging of the throat at its bottom, and an encircling expansible means yieldingly resisting rocking movement of the segments.

9. A closure applying throat formed of a series of similar segments, said segments having at their upper ends external grooves in circumferential continuation, a split ring engaged in said grooves and acting to hold the segments together and against longitudinal displacement relative to each other while permitting separation of the segments at their lower ends, and a coil spring surrounding the throat below said ring and yieldingly resisting such separation.

10. A closure applying throat formed of a series of similar segments, said segments having at their upper ends external grooves in circumferential continuation, a split ring engaged in said grooves and acting to hold the segments together and against longitudinal displacement relative to each other while permitting separation of the segments at their lower ends, a coil spring surrounding the throat below said ring and yieldingly resisting such separation, the lower inner edge of said throat being substantially circular and the throat being interiorly and circumferentially enlarged above said edge.

11. A closure applying throat formed of a series of similar segments, said segments having external flanges at their upper ends arranged in circumferential continuation and grooved at their outer ends to provide a circumferential groove, a split ring engaged in said groove and acting to hold the segments together and against longitudinal displacement relative to each other while permitting separation of the segments at their lower ends, and a coil spring surrounding the throat below said flanges and yieldingly resisting such separation.

12. A closure applying throat formed of a series of similar segments, said segments having external flanges at their upper ends arranged in circumferential continuation and grooved at their outer ends to provide a circumferential groove, a split ring engaged in said groove and acting to hold the segments together and against longitudinal displacement relative to each other while permitting separation of the segments at their lower ends, a coil spring surrounding the throat below said flanges and yieldingly resisting such separation, the lower inner edge of said throat being substantially circular and the throat being interiorly and circumferentially enlarged above said edge.

13. In a capping machine, a sealing head comprising a throat tapered downwardly interiorly in its normal state to an extreme substantially circular inner edge adapted to engage a substantially flat closure member inwardly of the edge of the latter to iron and draw the marginal portion of the closure member smoothly over the top external surface of a circular container bead upon relative movement of the head and container in the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as a result of the ironing and drawing action of said throat, taking a natural locking crimp below said line of maximum circumference.

14. In a capping machine, a sealing head comprising an expansible throat tapered downwardly interiorly in its normal state to an extreme substantially circular inner edge adapted to engage a substantially flat closure member inwardly of the edge of the latter to iron and draw the marginal portion of the closure member smoothly over the top external surface of a circular container bead upon relative movement of the head and container in the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

15. In a capping machine, an annular ledge adapted to support and position a substantially flat closure member above the circular bead of a container to be capped, a sealing head comprising a throat above said ledge tapered downwardly interiorly in its normal state to an extreme substantially circular inner edge adapted to engage said closure member inwardly of the edge of the latter to iron and draw the marginal portion of the closure member smoothly over the top external surface of said bead upon relative movement of the head and container in the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

16. In a capping machine, an annular ledge adapted to support and position a substantially flat closure member above the circular bead of a container to be capped, a sealing head comprising an expansible throat above said ledge tapered downwardly interiorly in its normal state to an extreme substantially circular inner edge adapted to engage said closure member inwardly of the edge of the latter to iron and draw the marginal portion of the closure member smoothly over the top external surface of said bead upon relative movement of the head and container in the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

17. In a capping machine, a sealing head comprising a throat tapered downwardly interiorly in its normal state to an extreme substantially circular inner edge adapted to engage a substantially flat closure member inwardly of the edge of the latter to iron and draw the marginal portion of the closure member smoothly over the top external surface of a circular container bead upon relative movement of the head and container in the capping operation, and a downwardly spring-pressed presser tool engaging the closure member within said circular edge during the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

18. In a capping machine, a sealing head comprising an expansible throat tapered downwardly interiorly in its normal state to an extreme substantially circular inner edge adapted to engage a substantially flat closure member inwardly of the edge of the latter to iron and draw the marginal portion of the closure member smoothly over the top external surface of a circular container bead upon relative movement of the head and container in the capping operation, and a downwardly spring-pressed presser tool engaging the closure member within said circular edge during the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

19. In a capping machine, an annular ledge adapted to support and position a substantially flat closure member above the circular bead of a container to be capped, a sealing head comprising a throat above said ledge tapered downwardly interiorly in its normal state to an extreme substantially circular inner edge adapted to engage said closure member inwardly of the edge of the latter to iron and draw the marginal portion of the closure member smoothly over the top external surface of said bead upon relative movement of the head and container in the capping operation, and a downwardly spring-pressed presser tool engaging the closure member within said circular edge during the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

20. In a capping machine, an annular ledge adapted to support and position a substantially flat closure member above the circular bead of a container to be capped, a sealing head comprising an expansible throat above said ledge tapered downwardly interiorly in its normal state to an extreme substantially circular inner edge adapted to engage said closure member inwardly of the edge of the latter to iron and draw the marginal portion of the closure member smoothly over the top external surface of said bead upon relative movement of the head and container in the capping operation, and a downwardly spring-pressed presser tool engaging the closure member within said circular edge during the capping operation, the diameter of said inner edge being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the marginal portion of the closure member, as the result of the ironing and drawing action of said throat, taking a natural locking crimp below said line of maximum circumference.

21. In a capping machine, an annular ledge adapted to support the marginal portion of a substantially flat closure member to position the closure member above the circular bead of a container to be capped, a sealing head comprising an expansible throat above said ledge having at its lower extremity a substantially circular inner edge adapted to engage said closure member inwardly of the edge of the latter to iron and draw the marginal portion of the closure member smoothly over the top external surface of the bead upon relative movement of the head and container in the capping operation, the diameter of said inner edge being normally substantially less than that of said ledge and being so related to the diameter of the container bead that during relative movement of the head and container in the capping operation said edge comes to a position in which it tightly embraces the marginal portion of the closure around the bead to effect an ironing and drawing action on said marginal portion substantially down to the line of maximum circumference of the bead as said relative movement continues, the lower portion of said throat expanding radially toward said ledge during said ironing and drawing action and the marginal portion of the closure member, as the result of the ironing and drawing action of the throat, moving radially inwardly of and eventually off of said ledge and taking a natural locking crimp below said line of maximum circumference.

GEORGE W. BOOTH.